(12) United States Patent
Jones

(10) Patent No.: X8877
(45) Date of Patent: Jun. 15, 1835

(54) AUGER

(76) Inventor: William Jones

William Jones a Citizen of the United States

Letters Patent.

The Schedule referred to in these Letters Patent and making part of the same, containing a description in the words of the said William Jones himself of his improvement in the Auger.

Specification for an improvement in the Auger to be used for removing the plank &c. from ships or vessels requireing repairs This improvement is a hollow Auger made so as to embrace the bolts or fastenings in ships or vessels and to cut the wood from around them, by which means the plank &c. can be removed, without the delay, trouble, and expense usually required by splitting them out.

Witnesses
Ch. A Grice
Jas A. Williams

Wm Jones.

(Drawing)

Exd
WGC

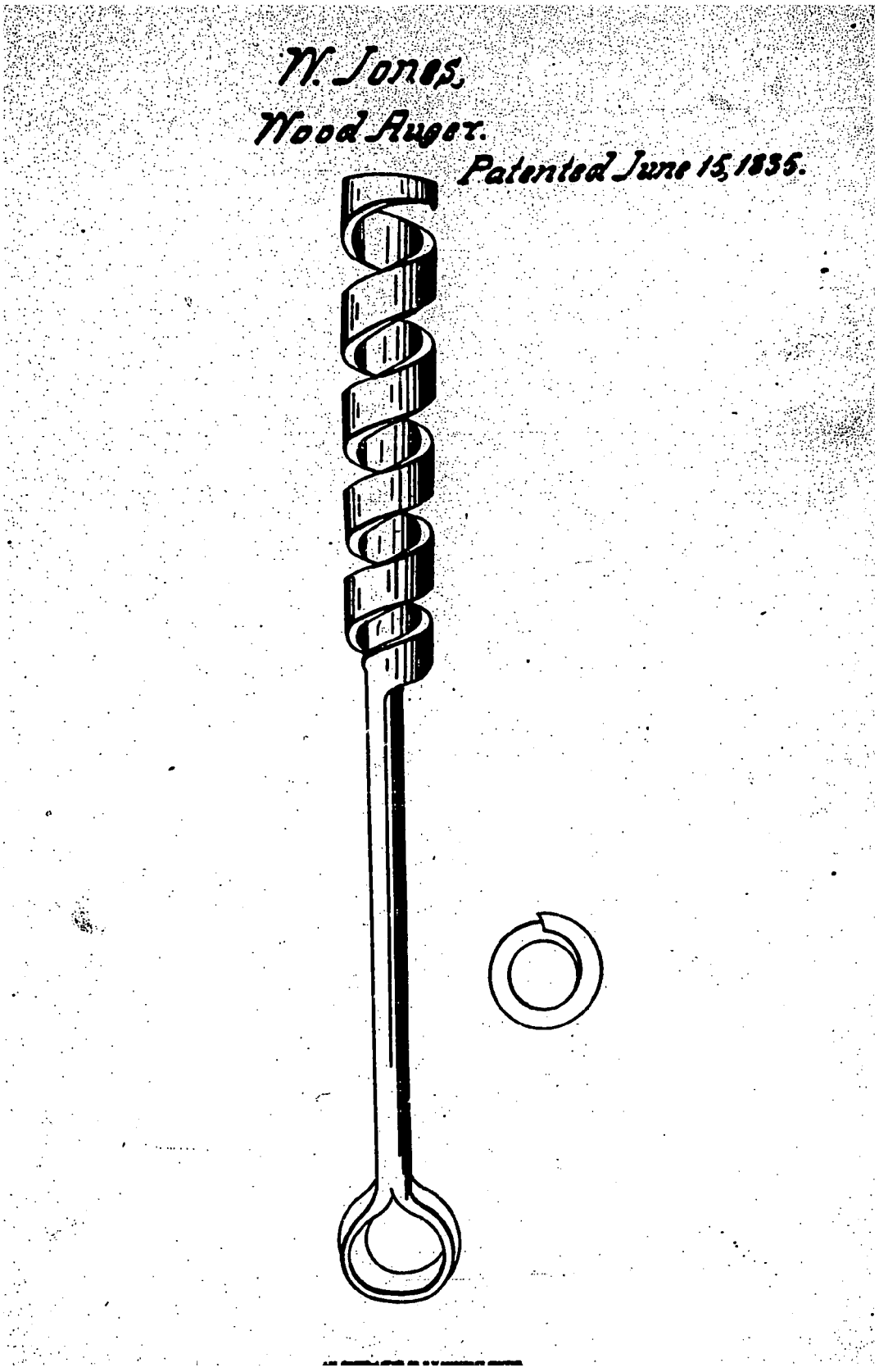

United States Patent
Patent No.: X8877